United States Patent [19]

Patterson, deceased

[11] 4,255,800

[45] Mar. 10, 1981

[54] METHOD AND APPARATUS FOR LOCATING UNDERWATER OBJECTS

[75] Inventor: Franklin G. Patterson, deceased, late of Schenectady, N.Y.

[73] Assignee: General Electric Company, Schenectady, N.Y.

[21] Appl. No.: 833,105

[22] Filed: Aug. 11, 1959

[51] Int. Cl.³ .............................................. G01S 15/06
[52] U.S. Cl. ...................................... 367/99; 367/96; 367/125; 367/156
[58] Field of Search .................. 340/3, 6, 9, 5, 8, 11, 340/13; 343/16.1, 5, 11, 16, 113, 7.4; 367/87, 95, 96, 125, 156, 99

[56] References Cited

U.S. PATENT DOCUMENTS

| | | | |
|---|---|---|---|
| 2,190,666 | 2/1940 | Kallmeyer | 367/156 |
| 2,333,688 | 11/1943 | Shepard | 367/95 |
| 2,400,309 | 5/1946 | Kock | 367/95 X |
| 2,407,662 | 9/1946 | Hart | 367/87 |
| 2,409,632 | 10/1946 | King | 367/96 |
| 2,411,910 | 12/1946 | Turner | 367/168 |
| 2,426,183 | 8/1947 | Deloraine | 343/16 |
| 2,467,368 | 4/1949 | Batchelder | 367/95 X |
| 2,702,379 | 2/1955 | Barton | 367/125 |
| 2,723,386 | 11/1955 | Camp | 367/168 |
| 2,724,818 | 11/1955 | Camp | 367/156 |
| 2,842,689 | 7/1958 | Harris | 367/168 |
| 2,914,762 | 11/1959 | Gross et al. | 343/16 |
| 2,921,288 | 1/1960 | O'Neill et al. | 367/168 X |
| 2,979,690 | 4/1961 | Hackley | 367/156 |
| 2,994,869 | 8/1961 | Woodyard | 343/16 |
| 3,040,310 | 6/1962 | Hausz | 343/113 |

OTHER PUBLICATIONS

*Aeronautical Engineering Review*, vol. 11, No. 5, May 1952, pp. 71-73.

*Primary Examiner*—Richard A. Farley
*Attorney, Agent, or Firm*—Francis K. Richwine

[57] ABSTRACT

2. In a combination, a transducer for an underwater object locator comprising a plurality of radiating elements, each element comprising a magnetostrictive member having a plurality of separate windings thereon, a first winding of each of said elements being connected in series for radiating a signal, a second winding of a first one-half of said elements being connected in series to form a first channel for receiving reflected signals, corresponding second windings of the other half of said elements being connected in series to form a second channel for receiving reflected signals, means responsive to the difference in amplitude of signals in said channels to provide azimuth information of a reflecting object, and means responsive to the difference in phase of signals in said channels to provide elevation information of such object.

4 Claims, 8 Drawing Figures

TRANSMITTING VERTICAL

RECEIVING VERTICAL

TRANSMITTING HORIZONTAL

RECEIVING HORIZONTAL

METHOD AND APPARATUS FOR LOCATING UNDERWATER OBJECTS

My invention relates to underwater object locating systems and, in particular, to underwater object locating systems using acoustic signals to guide and control the path of a torpedo with respect to an object.

In searching for objects in water, it is desirable to use a system which gives information for steering the torpedo both in azimuth and in elevation. It has been customary in a guidance system for such torpedoes to employ an acoustic system of the "on-off" type, in which system an acoustic signal is transmitted, and the signal received after reflection from an object in the water is used to direct the heading of the torpedo in azimuth toward the object when no signal is received and to direct the heading away from, or at an angle with respect to, the object when a signal is received. In such a system, acoustic contact is maintained with the object on only about fifty percent of the transmissions. This results in a sinuous course for the torpedo so that its direction is not pointed at the object but, on the average, at some angle with respect to the object. In such a system, if the object is moving, the torpedo will be pointed at either one side or the other of the object, depending upon the relative direction of the object. It has long been desired to have a system in which the torpedo is pointed continuously at the object, whether that object be stationary or moving. Accordingly, it is a principal object of my invention to provide new and improved methods and apparatus for detecting underwater objects which employ an acoustic detecting system having a highly directional pattern and which supply signals continuously to guide a torpedo with respect to an underwater object.

In acoustic systems using such underwater location, it is customary to employ a transducer of the type having a plurality of magnetostrictive elements, each having a winding thereon, the transducer being divided into two halves, and the windings of each half being connected in series. For transmitting the acoustic signal, the two halves are connected in parallel. For steering the torpedo, the reflected signals received by the two halves of the transducer are used separately, the average amplitude of the combined signals being used to control the course of the torpedo in an on-off path in azimuth. For steering in elevation, the difference in phase of the signals received by the upper and the lower halves of the transducer is employed. For optimum steering, it is desirable to have an acoustic system which functions symmetrically in azimuth about the object being located and which is relatively narrow vertically. At the same time, it is desired to have as simple a transmitting and receiving system as possible to enhance the reliability of the system and reduce the chance of failure at a critical time.

It is a further object of the present invention, therefore, to provide a new and improved transducer for underwater object locating systems which transmits a signal in the form of two horizontally displaced overlapping acoustic lobes to facilitate the locating of an object underwater.

Another object of the invention is to provide a new and improved transducer of the type employing magnetostrictive elements having windings thereon, which windings are connected to provide highly directional reception of reflected signals.

One of the features of my invention consists in employing, in an underwater object locating system, a transducer consisting of two halves arranged vertically, the halves being twisted or angularly displaced with respect to each other so that greater accuracy of information is obtained, azimuth informating appearing in terms of the relative magnitude of signals received by the two halves, whereas elevation information is in terms of the relative phase between the two signals.

Another feature consists in employing a transducer consisting of two halves, each having magnetostrictive elements having multiple windings thereon and connecting corresponding first windings on all elements of each half in series, the two halves being connected in parallel for the transmission of a signal, while for reception of a signal the two halves are used separately, a second winding of each element of each half being connected in series and in series with additional windings on selected elements of the other half of the transducer.

Other objects, features, and many of the attendant advantages of my invention will be appreciated more readily as the same become better understood by reference to the following detailed description when considered in connection with the accompanying drawings, wherein like parts of the several figures are identified by the same reference numeral, and wherein FIG. 1 is a functional block diagram of the underwater object locating system embodying my invention;

Figure 1:
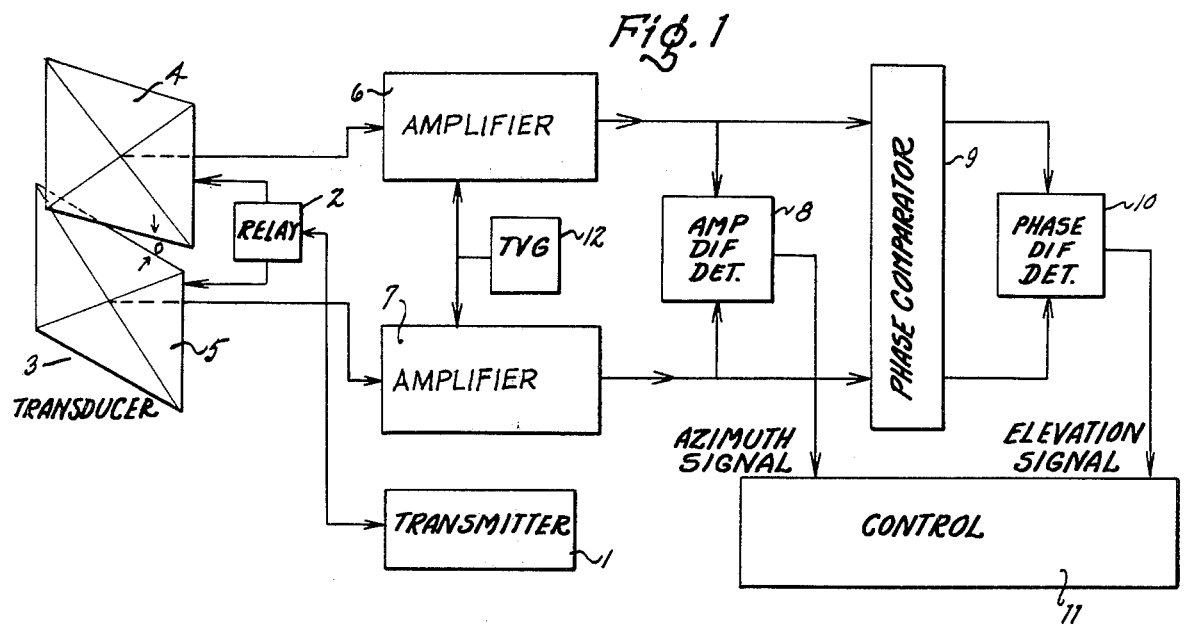

In the underwater object locating system illustrated in FIG. 1, I have shown a transmitter 1 operative to supply, through a relay 2, an acoustic signal simultaneously to both halves of a transducer 3. The transducer 3 is illustrated as comprising a pair of planar arrays 4 and 5 which are angularly displaced, or twisted, through an angle $\theta$. The upper half 4 of transducer 3 is connected to a first amplifier 6 of a receiver, the lower half being connected to a second amplifier 7. Amplifiers 6 and 7 are conventional in character and include the customary transmit-receive protective devices (not shown). The amplitudes of the output signal of the amplifiers 6 and 7 are compared in an amplitude difference detector 8 to supply a signal varying with the azimuth of a reflecting object relative to the transducer 3. The same signals at the output of amplifiers 6 and 7 are, likewise, supplied through a phase comparator 9 to a phase difference detector 10 to produce a voltage varying as the elevation of a reflecting object relative to the transducer 3. Both the azimuth varying signal supplied from the amplitude difference detector and the elevation varying signal supplied from phase difference detector 10 are supplied to control means 11, which can be employed to control the direction of a searching vessel or a torpedo, as the case may be, relative to a reflecting object. The circuit of FIG. 1, likewise, has connected between the amplifiers 6 and 7 a conventional time variable gain circuit 12, whose function is to adjust the gain of the receiver circuits as a function of time in order to make the receiver insensitive to noise signals produced by either the surface or the bottom of the body of water, or by volume reverberation.

In the operation of the circuit of FIG. 1, a short pulse of signals is transmitted by transmitter 1 through relay 2 and transducer 3 to illuminate an object in the water with acoustic energy. The transducer 3 and the receiver circuits utilize the echo reflected from the object to provide information concerning the azimuth and elevation of the object relative to transducer 3 for controlling the navigation of the vehicle utilizing the underwater object locating system.

In the perspective view of the transducer 3 shown in FIG. 2, a plurality of magnetostrictive elements 13 comprise laminations of a configuration to be described later. The outer faces of the elements of each half of the transducer are arranged to present a planar array. Thus, the outer faces 14 of the elements 13, which comprise the transducer half or array 4, all lie in the same plane. Similarly, the outer faces 14 of the elements which comprise the half or array 5 lie in a single plane. The elements 13 are affixed in any suitable way, as by either vulcanizing or cementing, to a support member 15 which, preferably, is constituted of a suitable sound transmitting waterproof material such as rubber.

Figure 2:
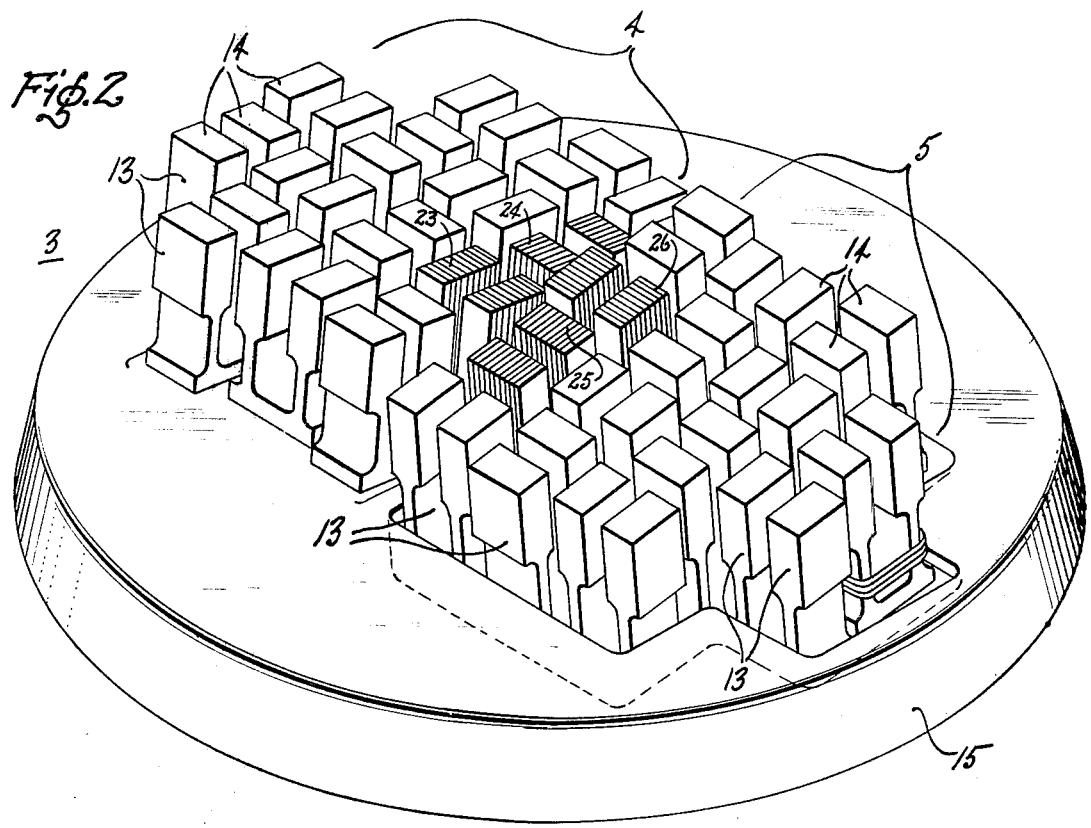
FIG. 2 is a perspective view of a transducer employed in the apparatus of FIG. 1.

As may be seen from FIG. 2, the array 4 is rotated about a vertical axis with respect to array 5 to form a crossed dihedral transducer. The angle of rotation, or twist, between the two arrays will depend upon the desired directivity pattern in a horizontal direction of the transducer for transmission. I have found that an angle of 15° between the two arrays produces a horizontal pattern sufficiently wide that the likelihood of losing contact with an object after such contact is once established is considerably diminished.

Figure 3:
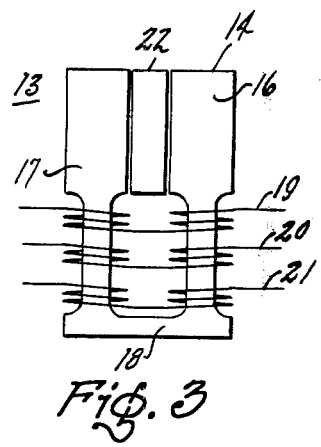
FIG. 3 is a side view of one of the magnetostrictive elements of the transducer of FIG. 2.

FIG. 3 illustrates a typical one of the magnetostrictive elements 13. This element comprises two elongated laminated legs 16, 17 joined at the base by connecting laminated member 18 to form a U-shaped structure. Encircling the lower portion of the legs 16, 17 are a plurality of windings 19-21. Positioned between the upper portions of the legs 16, 17 is a permanent magnet 22 which may be supported between the inner surfaces of the legs in a suitable manner not to cause damping such as by an adhesive tape.

In accordance with my invention, separate windings on the magnetostrictive elements are used for transmitting and receiving signals, and the number of turns of the windings for both transmission and reception is arranged to produce desired directivity patterns. Thus, the windings 19 of all the elements 13 of array 4 are connected in series and are connected in parallel with serially connected windings 19 of the elements of array 5. The number of turns in each winding varies with its distance from the center of the transducer, both vertically and horizontally. This is illustrated in the drawing of FIG. 4, in which the blocks represent elements 13, and the number of turns of the transmitting windings on each element is given by the unenclosed number on that element.

For reception of reflected signals, the transducer 3 is electrically separated into its upper and lower halves, and each half is connected to one of the two receiver channels as previously mentioned. In this manner, each half of the transducer thus becomes in effect a separate transducer. Separate windings on the transducer for reception allow the full array to be shaded in an optimum manner for reception with a two channel receiver.

In a receiver it is desirable to decrease the separation between the effective centers of the two transducer halves so that the resultant directivity characteristic is concentrated toward a central point. In accordance with my invention, this result is achieved by using separate windings 20 for reception, the windings 20 of an array being connected in series. Additionally, I employ, on certain selected elements of the arrays 4 and 5, third windings 21 which are connected in series with the windings 20 of the other array. The effect, therefore, is to provide an overlapping of windings and produce a directivity pattern for each array which can be independently controlled by the number of turns in the windings 20 and 21. When such a transducer is used for reception, the spacing of the effective centers of the windings determines the phase sensitivity of the two arrays.

Figure 4:
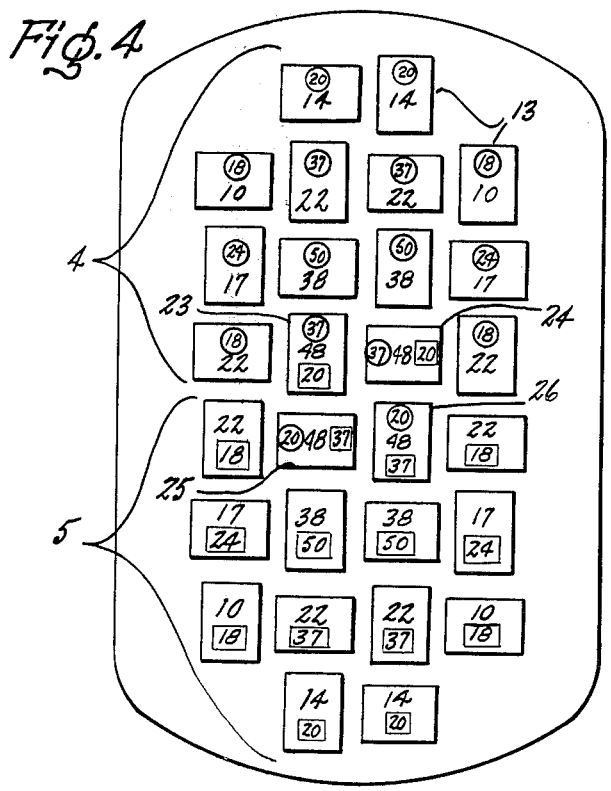
FIG. 4 is a block diagram of the transducer of FIG. 2, and FIGS. 5–8 are curves illustrating certain operational characteristics of the system of FIG. 1.

In FIG. 4 the number on each element 13 included in a circle indicates the number of winding turns on that element which is connected in the receiver circuit for the upper array 4, while the number of winding turns on the element connected in the receiver circuit for the lower array 5 is enclosed in a square. FIG. 4 shows how the additional winding 21 is included only on the four central elements of the transducer which comprise adjacent or juxtaposed elements of the two arrays. These elements are indicated by the numerals 23-26 in FIGS. 2 and 4. In accordance with the principles discussed previously, the windings 21 of elements 25 and 26 are connected in series with the windings 20 of all of the elements of array 4, and the windings 21 of elements 23 and 24 are connected in series with the windings 20 of all of the elements of array 5.

Figure 5:
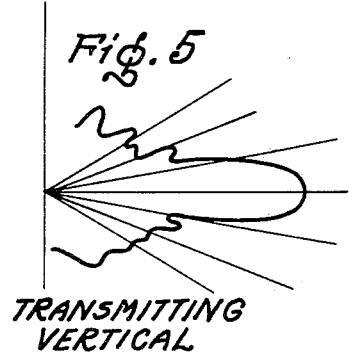
Figure 7:
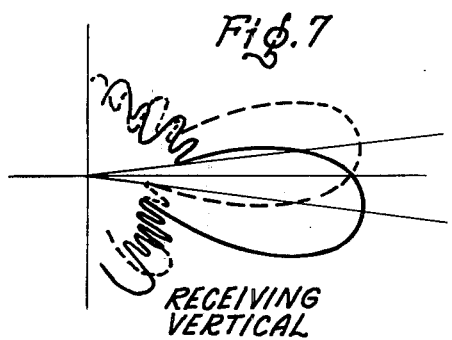
Figure 6:
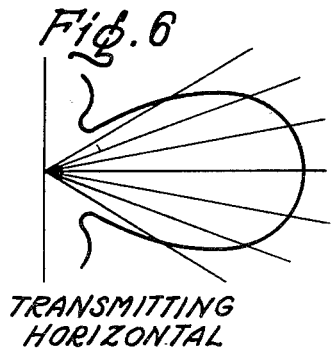
Figure 8:
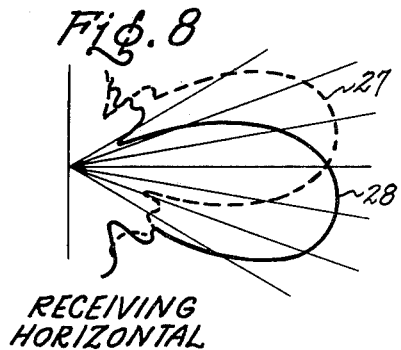

The directivity patterns of the transducer for transmission are illustrated by FIGS. 5 and 6, FIG. 5 illustrating the vertical transmission pattern of the transducer, and FIG. 6 illustrating the horizontal transmission pattern of the transducer. The directivity patterns of the transducer for reception of signals are illustrated in FIGS. 7 and 8, FIG. 7 illustrating the vertical pattern for reception, and FIG. 8 illustrating the horizontal pattern for reception. In FIGS. 5-8, the distance from the origin of the pattern is a measurement of the relative response in decibels and the distance from the horizontal axis is a measurement of the angular directivity of the transducer.

FIG. 8 illustrates the manner in which the angular separation between the arrays 4 and 5 produces two horizontally displaced acoustic lobes 27, 28 which at their intersection produce an equi-signal axis. By simultaneously comparing these lobes as they are received by the arrays 4 and 5, it is possible to determine whether an object to be located is to the right or to the left of the torpedo.

While I have shown and described particular embodiments of my invention, it will, of course, be understood that I do not wish to be limited thereto since various changes and modifications may be made without departing from my invention, and I contemplate by the appended claims to cover all such changes and modifications as fall within the true spirit and scope of my invention.

What I claim as new and desire to secure by Letters Patent of the United States is:

1. A dihedral transducer comprising two planar arrays of radiating elements, the elements in each array having substantially parallel planar faces and the planes of said arrays intersecting to form an angle of the order of 15°, each of said elements comprising a magnetostrictive member having at least two separate windings thereon, one winding of all elements of each array being connected in series, the second winding of all elements in each array being connected in series, two elements in each array being positioned adjacent the other array and having third windings connected in series with the second windings of the other array.

2. In a combination, a transducer for an underwater object locator comprising a plurality of radiating elements, each element comprising a magnetostrictive member having a plurality of separate windings thereon, a first winding of each of said elements being connected in series for radiating a signal, a second winding of a first one-half of said elements being connected in series to form a first channel for receiving reflected signals, corresponding second windings of the other half of said elements being connected in series to form a second channel for receiving reflected signals, means responsive to the difference in amplitude of signals in said channels to provide azimuth information of a reflecting object, and means responsive to the difference in phase of signals in said channels to provide elevation information of such object.

3. A transducer for an underwater object locator comprising two planar arrays of radiating elements, each of said elements comprising a magnetostrictive member having at least two separate windings thereon, all of said elements of each array having a first of said windings connected in series and such serially connected windings of said two arrays being connected in parallel, the second windings of all elements in each array being connected in series, each array having two elements juxtaposed with corresponding elements of the other array, said two elements of each array having third windings connected in series with the second windings of the other array.

4. A transducer for an underwater object locator comprising a watertight supporting means, a plurality of magnetostrictive elements supported on said watertight means, said elements being arranged in two arrays, each array having radiating surfaces lying in a plane, the surfaces in one array being disposed at an angle with respect to the plane of the surfaces in the other array, each of said elements including a first winding, the first winding in each array being connected in series and the serially connected first windings of said arrays being connected in parallel for transmission of a signal, said elements having a second winding, the second windings of each array being connected in series, selected elements in each array having third windings connected in series with the second windings of the other array, each series circuit of second and third windings forming a separate channel for reception of a signal after reflection from an object in water.

* * * * *